Aug. 21, 1956   L. B. GREEN   2,759,513
METHOD AND APPARATUS FOR STRETCH BENDING METAL MEMBERS
Filed Aug. 20, 1952   10 Sheets-Sheet 1
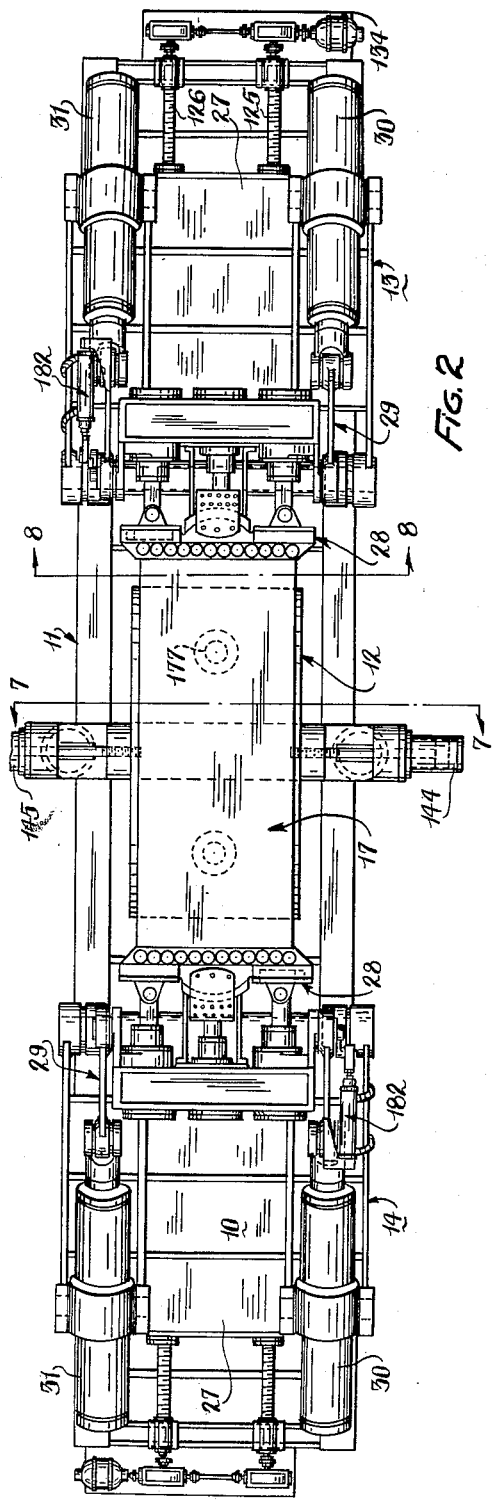
INVENTOR.
LEE B. GREEN
BY Hudson, Boughton,
Williams, David Hoffmann
ATTORNEYS.

Aug. 21, 1956 L. B. GREEN 2,759,513
METHOD AND APPARATUS FOR STRETCH BENDING METAL MEMBERS
Filed Aug. 20, 1952 10 Sheets-Sheet 2

INVENTOR.
LEE B. GREEN
BY Hudson, Boughton,
Williams, David & Hoffmann
ATTORNEYS

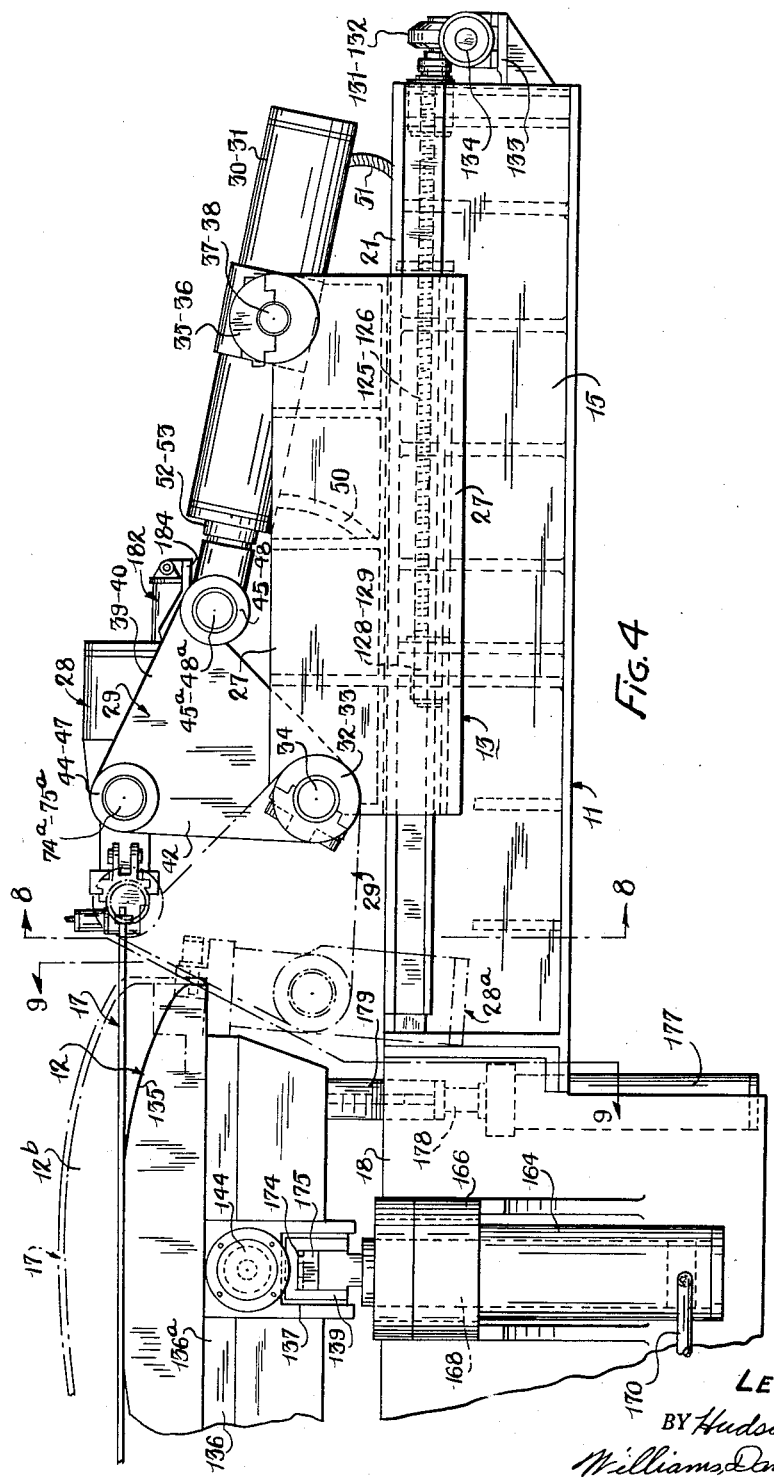

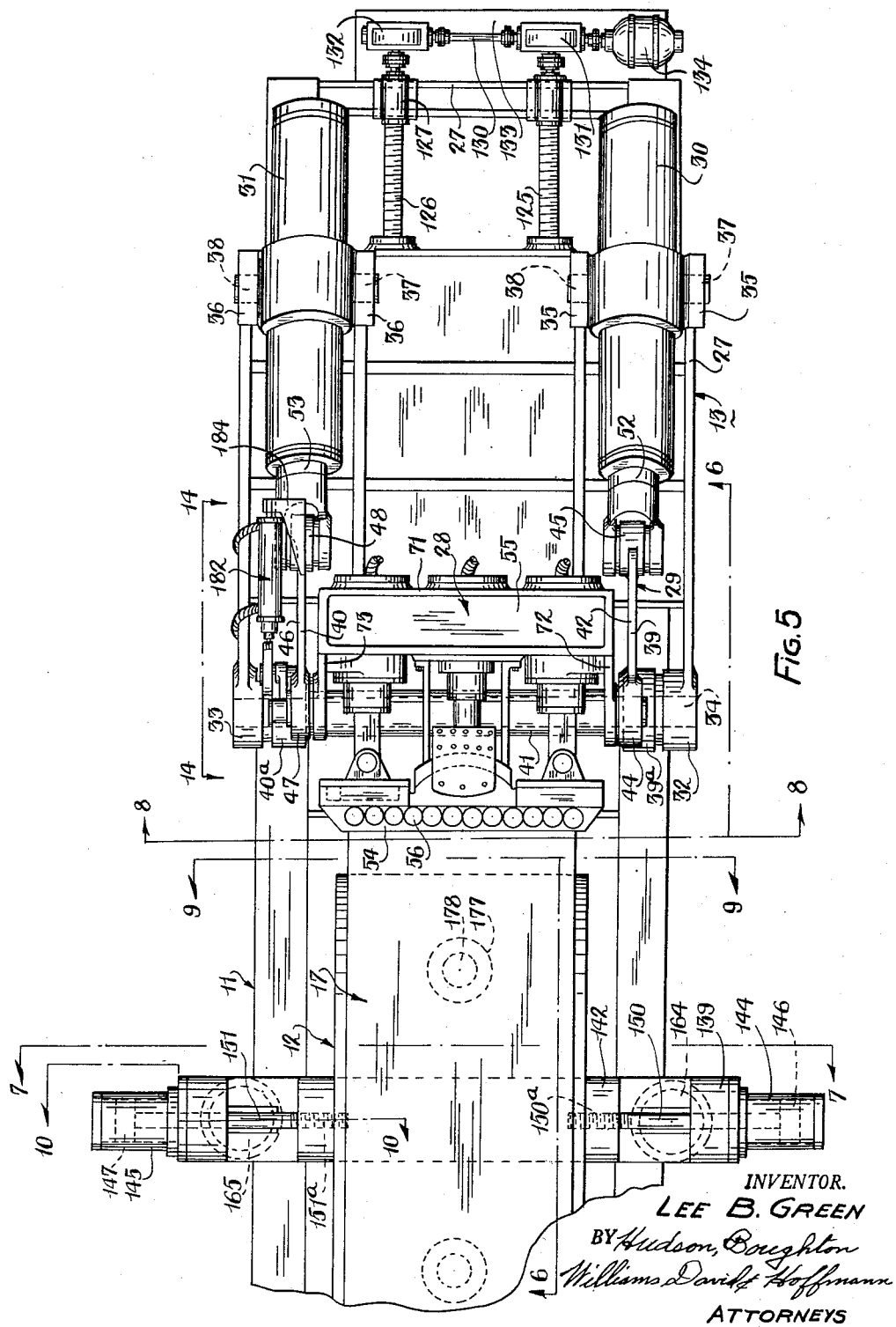

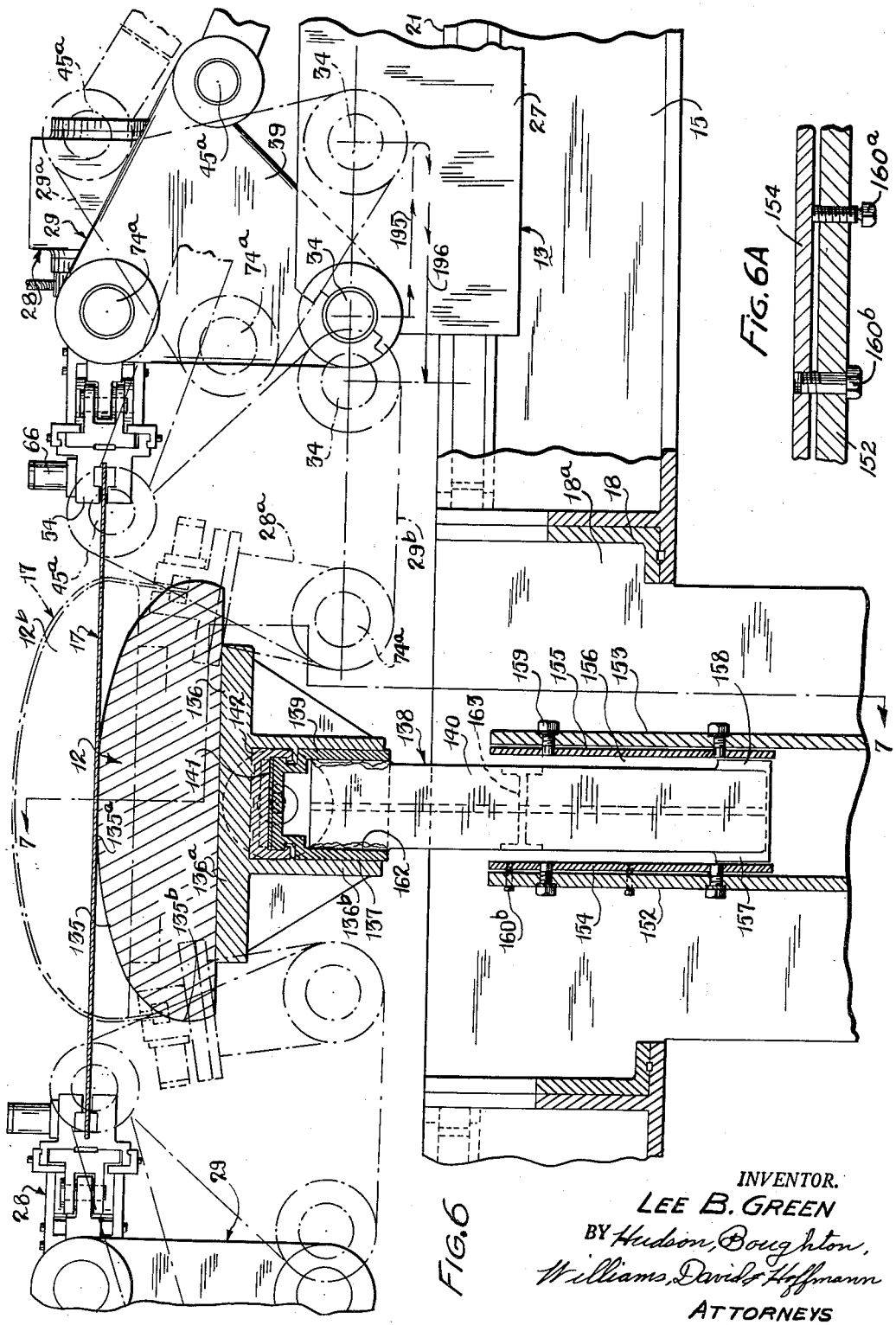

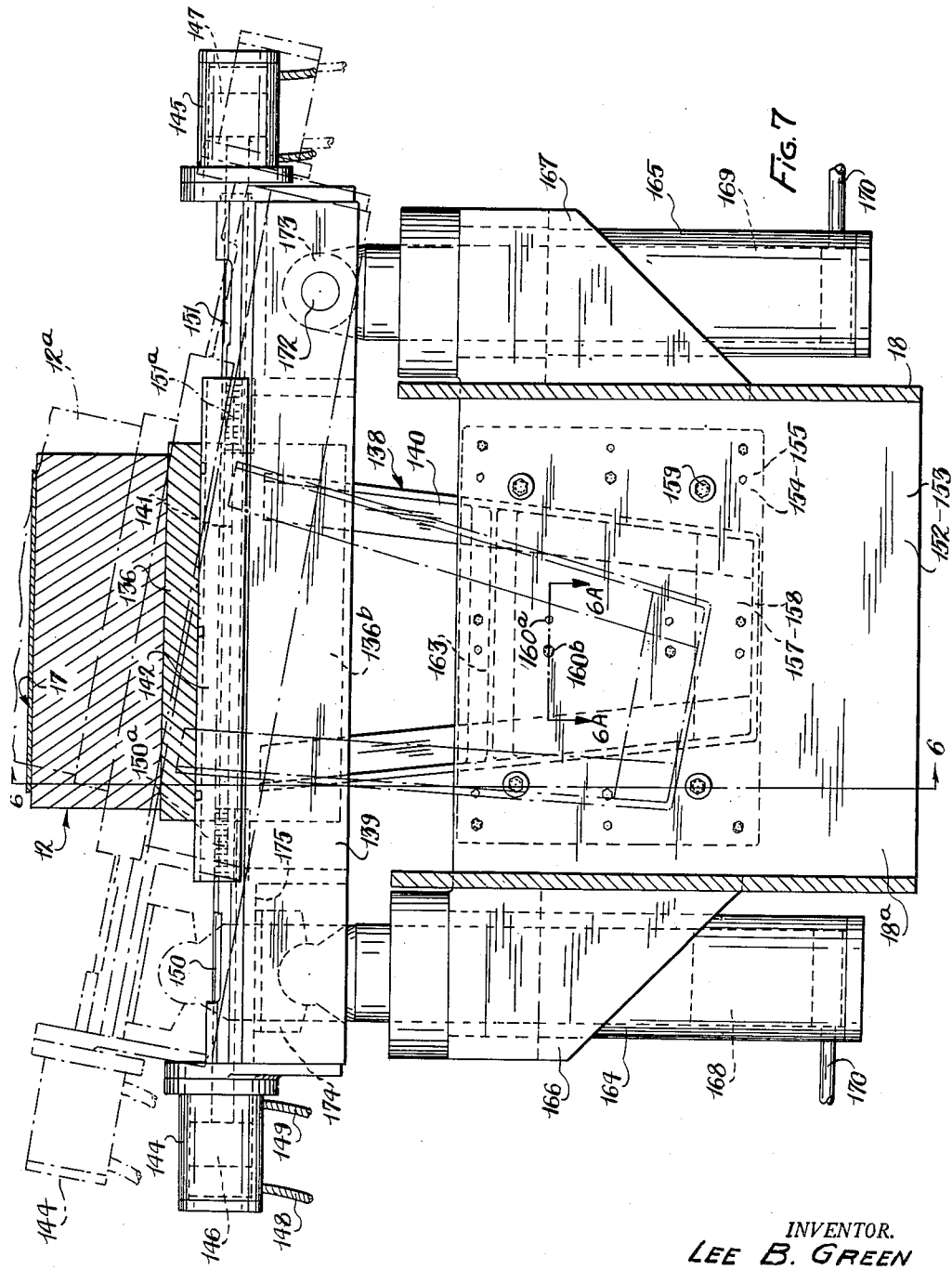

Aug. 21, 1956 L. B. GREEN 2,759,513
METHOD AND APPARATUS FOR STRETCH BENDING METAL MEMBERS
Filed Aug. 20, 1952 10 Sheets-Sheet 7

INVENTOR.
LEE B. GREEN
BY Hudson, Boughton,
Williams, Davis & Hoffmann
ATTORNEYS

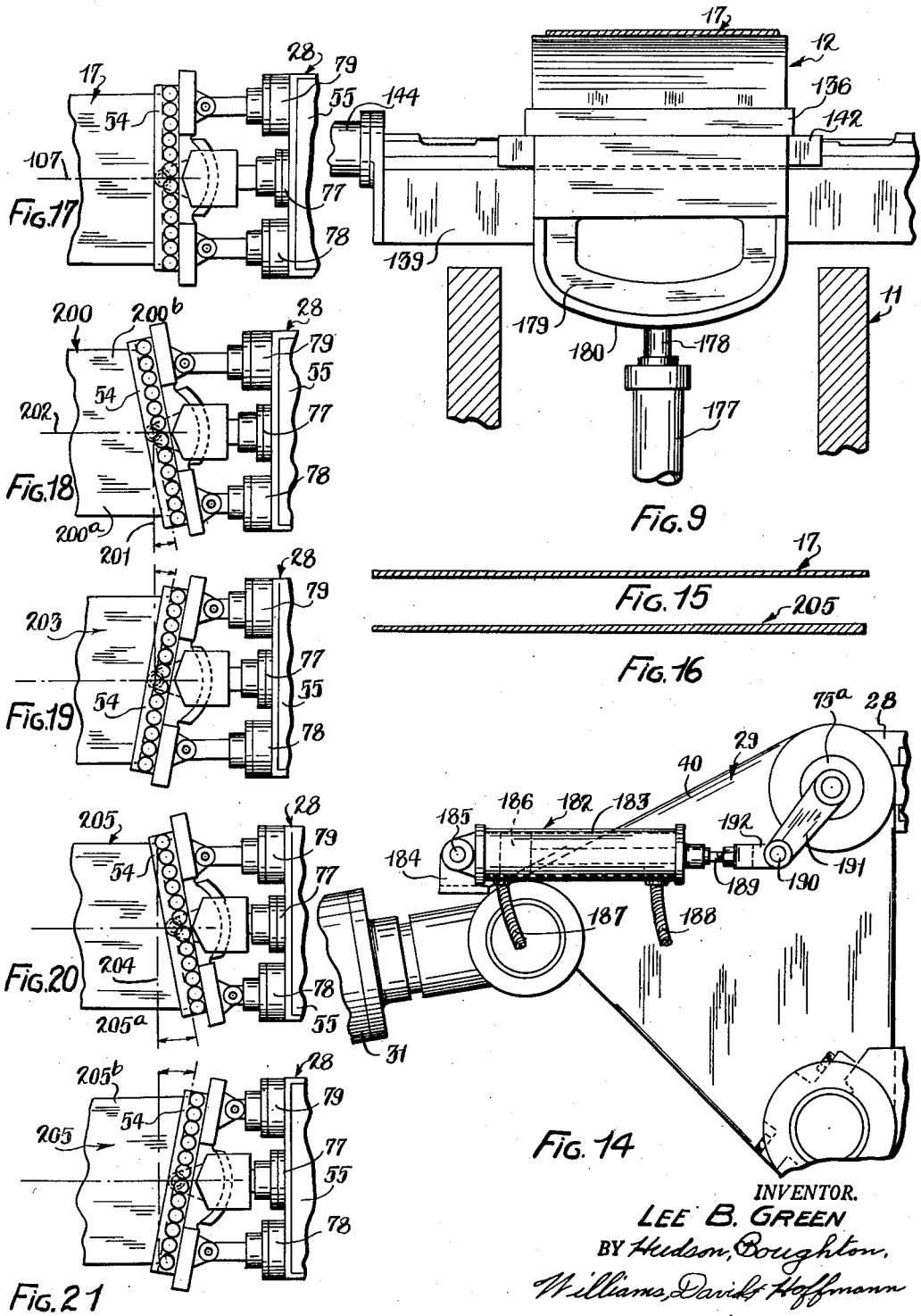

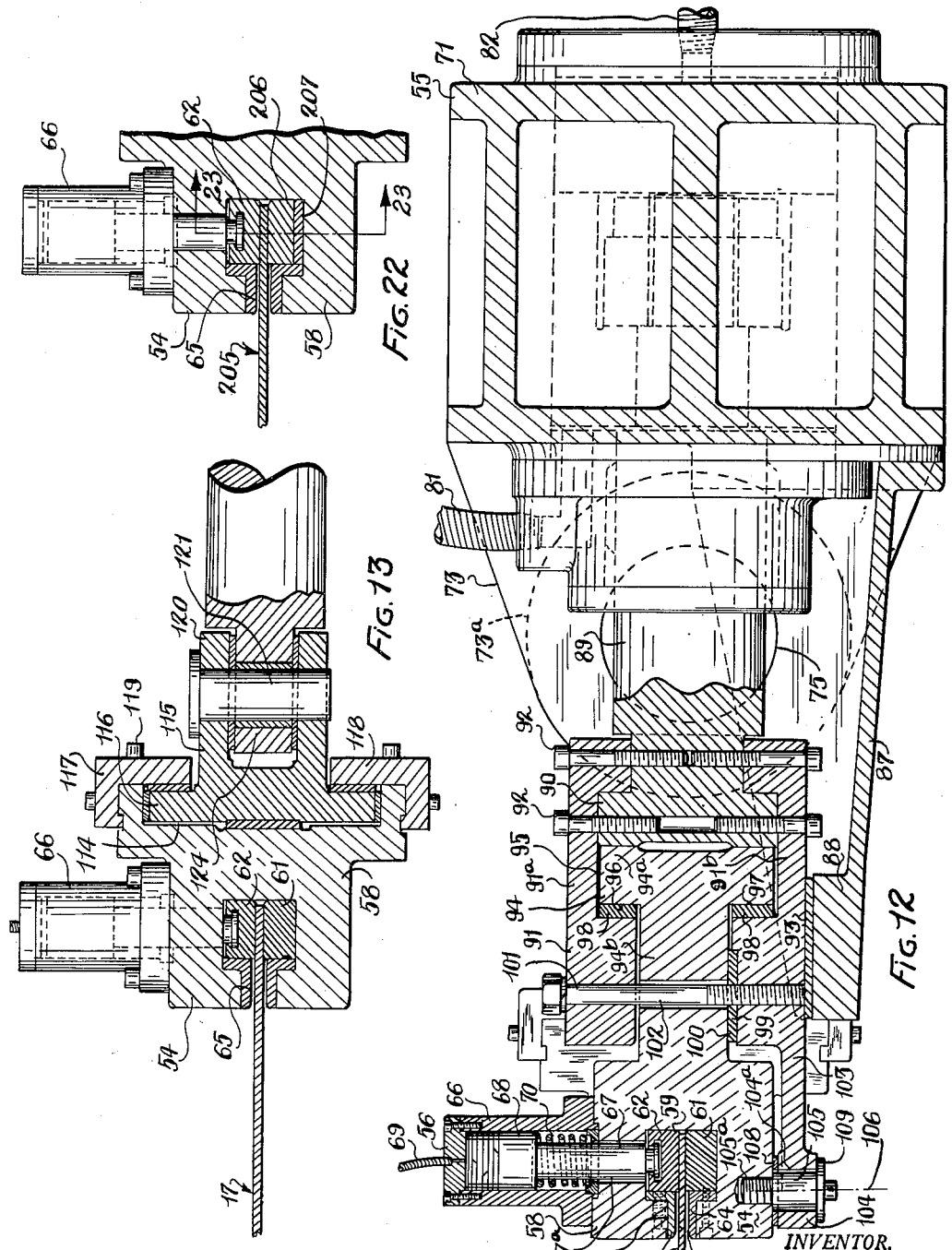

United States Patent Office 2,759,513
Patented Aug. 21, 1956

2,759,513

METHOD AND APPARATUS FOR STRETCH BENDING METAL MEMBERS

Lee B. Green, Lakewood, Ohio

Application August 20, 1952, Serial No. 305,377

15 Claims. (Cl. 153—48)

This invention relates to a method and apparatus for shaping metal workpieces by applying thereto substantially simultaneous stretching and bending forces, and which method and apparatus are conveniently referred to herein as a stretch bending method and a stretch bending apparatus.

The method and apparatus of this invention can be used to perform shaping operations on a great variety of different workpieces of specifically different cross-sectional shapes, but are especially applicable to the shaping of metal sheets of substantial width by a combined stretching and bending thereof and are so disclosed herein, but without any intention of limiting the method and apparatus to this particular kind of workpiece.

An object of this invention is to provide a novel stretch bending method and apparatus employing a die punch which is engaged against an intermediate portion of a workpiece being subjected to a stretching force by a pair of work gripping units and in which the stretch bending is accomplished, in part, by a movement of the die punch transversely of the general direction of the initial stretching force and, in part, by a combined swinging and rectilineal movement of the gripping units relative to the die punch.

Another object is to provide such a novel stretch bending method and apparatus in which the die punch is tiltable in a plane extending transversely of the general direction of the initial stretching force.

Still another object is to provide such a novel stretch bending method and apparatus in which the die punch is both tiltable and reciprocable in a plane extending transverse to the general direction of the initial stretching force.

A further object is to provide such a novel stretch bending method and apparatus in which the end portions of the workpiece are wrapped around curved end portions of the die punch and the direction of the application of the stretching force is changed progressively to maintain the end portions of the workpiece substantially tangent to the curved portions of the die punch, and wherein the die punch is reciprocable and/or tiltable in a plane extending transverse to the general direction of the initial stretching force.

Still another object is to provide novel stretch bending apparatus in which a die punch adapted to apply a bending force to a workpiece has a forward work stroke movement and a gripping unit adapted to apply a stretching force to the workpiece is engageable with an end thereof and is swingable inwardly and rearwardly relative to the die punch during the forward work stroke movement of the latter.

Yet another object is to provide novel stretch bending apparatus of the character just mentioned in which the gripping unit is carried by slide means which is movable rectilinearly toward and away from the die punch.

As another object, this invention provides stretch bending apparatus of the character just above indicated, in which the swinging of the gripping unit inwardly and rearwardly relative to the die punch is a resultant of a rectilineal movement of the slide means and of a rocking movement of a rocker means by which the gripping unit is mounted on the slide means.

It is, likewise, an important object of the invention to provide novel stretch bending apparatus in which the stretching force is applied to the workpiece through a grip head which is elongated transversely of the workpiece and in which the grip head is tiltable relative to a transverse line extending substantially normal to the longitudinal center line of the machine and of the workpiece.

Another object is to provide novel stretch bending apparatus in which the mechanism for applying the stretching force to the workpiece through said grip head includes power cylinder means having a flexible operating connection with the grip head to permit the relative tilting of the latter.

Still another object is to provide novel stretch bending apparatus in which the gripping unit includes a cylinder carrier and said grip head, and in which the grip head is pivoted on the cylinder carrier for relative tilting about a pivot axis located substantially on the longitudinal center line of the machine and of the workpiece.

It is a further object of this invention, to provide novel stretch bending apparatus in which the power cylinder means of the cylinder carrier comprises cylinders spaced apart transversely of the workpiece and in which the piston means of such cylinders are flexibly connected with the grip head and produce the relative tilting of the latter.

Additionally, this invention provides novel stretch bending apparatus in which substantially aligned guideways are located on opposite sides of the die punch and the work gripping units are swingable in rocker members which, in turn, are pivotally mounted on slide means which are movable along the aligned guideways, and in which power devices mounted on the slide means are effective to impart rocking movement to the rocker members.

As a further object, this invention provides novel stretch bending apparatus of the character just mentioned above, in which the rocker members comprise spaced apart paired bracket members, preferably of a generally triangular shape, which are pivoted on the slide means on a common pivot axis and between which bracket members the gripping units are trunnioned for their swinging movement relative to the die punch.

The invention can be further briefly summarized as consisting in certain novel combinations and arrangements of parts hereinafter described and particularly set out in the claims hereof.

In the accompanying sheets of drawings:

Fig. 1 is a front elevation of a stretch bending machine embodying the present invention and with which the novel stretch bending method can be carried out;

Fig. 2 is a top plan view of the machine;

Fig. 4 is a partial front elevation corresponding with the right-hand end of the machine of Fig. 1, but showing the same on a larger scale;

Fig. 5 is a partial plan view corresponding with the right-hand end of the machine, but showing the same on a larger scale;

Fig. 6 is a partial longitudinal vertical section taken approximately on section line 6—6 of Figs. 5 and 7, but with the stabilizing cylinders omitted and with the die punch shortened somewhat longitudinally of the machine, the view being somewhat diagrammatic in form and illustrating the movements of the gripping units and of the die punch during the stretch bending operation;

Fig. 6A is a fragmentary transverse sectional view taken as indicated by section line 6A—6A of Fig. 7 and illustrating certain bearing plate mounting and adjusting means;

Fig. 7 is a transverse section taken through the machine substantially on section line 7—7 of Figs. 2, 5 and 6 and showing the die punch supporting and actuating means and also showing a tilted position to which the die punch is movable;

Fig. 9 is a partial transverse section of the machine taken approximately on section line 9—9 of Figs. 4 and 5;

Fig. 12 is a longitudinal section taken through the work gripping unit of Fig. 11 substantially as indicated by section line 12—12 thereof;

Fig. 13 is a partial longitudinal section taken through the work gripping unit of Fig. 11 at another point thereof, the view being taken as indicated by section line 13—13 thereof;

Fig. 14 is a partial rear elevation showing a portion of the right-hand end of the machine, the view being taken substantially as indicated by section line 14—14 of Fig. 5;

Fig. 15 is a transverse section taken through a workpiece of substantially uniform thickness thereacross;

Fig. 16 is a similar transverse section, but showing a workpiece having a tapered thickness;

Fig. 17 is a partial plan view, somewhat diagrammatic in form, and showing the grip head of one of the work gripping units engaged with a square-end workpiece and applying a stretching force thereto which is substantially uniform for both edge portions of the workpiece;

Fig. 18 is a similar plan view, but showing the grip head in a tilted position and engaged with a bevel-end workpiece and applying a stretching force thereto which is substantially uniform for both edge portions of the workpiece;

Fig. 19 is a plan view similar to Fig. 18, but showing the grip head engaged with a workpiece having an oppositely beveled end;

Fig. 20 is a plan view similar to Fig. 17, but showing the tilted position of the grip head resulting from a greater amount of stretch being produced in one edge portion of the workpiece than in the opposite edge portion;

Fig. 21 is a plan view similar to Fig. 19, but showing the unequal stretch condition reversed with respect to the edge portions of the workpiece;

Fig. 22 is a fragmentary sectional view taken through one of the grip heads and showing the same adapted for use with the tapered thickness workpiece of Fig. 16.

Figure 3:
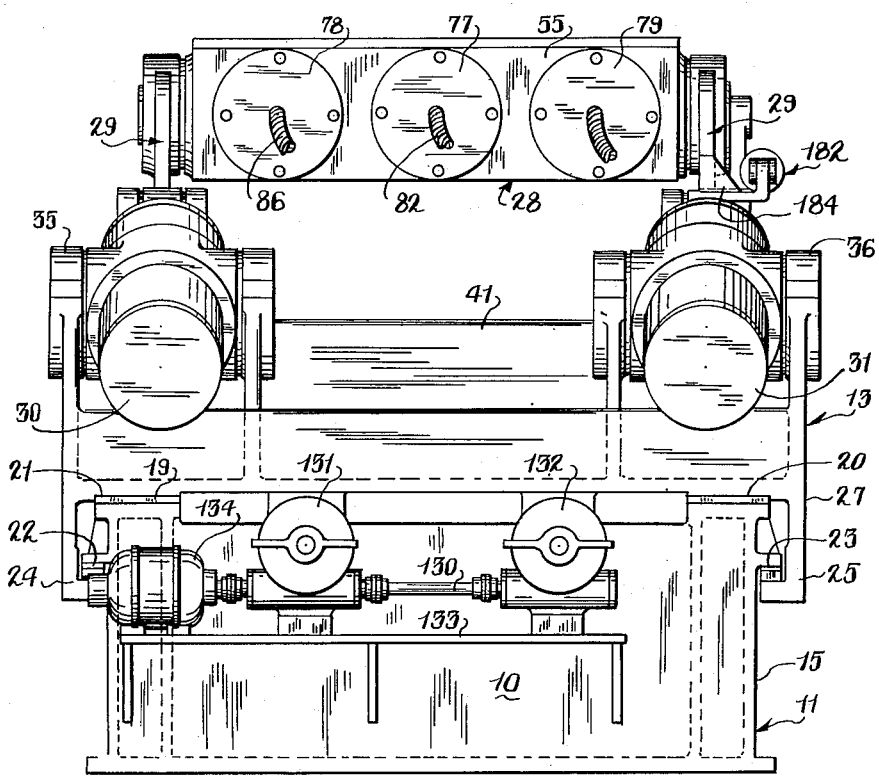
Fig. 3 is an end view of the machine, as seen from the right-hand end thereof.

As representing one practical embodiment of this invention, the drawings show a stretch bending machine 10 comprising, in general, a main frame 11, a die punch 12 located at an intermediate point of the main frame 11, and a pair of pulling units 13 and 14 located on opposite sides of the die punch and movable along oppositely extending end portions 15 and 16 of the main frame. The drawings also show a workpiece 17, in this instance an elongated relatively wide metal sheet, extending longitudinally of the machine and across the die punch 12 and having its opposite ends engaged by the pulling units 13 and 14.

The main frame

The main frame 11 comprises the oppositely extending substantially longitudinally aligned end frame members 15 and 16 and an intermediate frame member 18 with which the adjacent ends of the end frame members are suitably connected. The intermediate frame member 18 is here shown as being a hollow upright frame member of somewhat greater depth than the end frame members and defining a pocket or chamber 18a in which guide means for the die punch 12 is located, as will be further explained hereinafter. The end frame members 15 and 16 are of an identical construction and, hence, one only of these members, namely the frame member 15, need be described in detail.

The end frame member 15 is in the form of a laterally elongated base having a pair of longitudinally extending front and rear guide surfaces 19 and 20 thereon defining a longitudinal guideway 21. The pulling units 13 and 14 are movable on the end frame members 15 and 16 by sliding movement along the guideways 21. The end frame member 15 is also provided with laterally extending front and rear longitudinal guide members 22 and 23 which serve as a hold-down means for the pulling unit 13 and are engaged by front and rear hook-shaped guide followers 24 and 25 depending from the pulling unit 13.

The pulling units

The pulling units 13 and 14 are of an identical construction and one only of these units, namely the unit 13, need be described in detail. The pullnig unit 13 comprises, in general, a slide means which is here represented by a main slide or carriage 27 movable along the guideway 21, a work gripping unit 28, and a rocker means 29 mounting the gripping unit on the carriage for swinging movement relative to the die punch 12. The pulling unit 13 also comprises power cylinder means, in this instance the two front and rear power cylinder devices 30 and 31, for producing the rocking movement of the rocker means 29.

The carriage 27 is provided at the inner end thereof with a pair of laterally spaced front and rear bearings 32 and 33 supporting a transverse rockshaft 34 on which the rocker means 29 is mounted. The outer end of the carriage 27 is provided with front and rear pairs of bearings 35 and 36 which pivotally support the front and rear power cylinder devices 30 and 31. The cylinders of each of these devices are provided at an intermediate point thereof with a pair of front and rear trunnions 37 and 38 which are journalled in the pairs of front and rear bearings 35 and 36 of the carriage.

The rocker member 29 comprises a pair of laterally spaced front and rear upright links or bracket members 39 and 40 which, in this instance, are shown as being of a substantially triangular shape. The rocker member 29 also comprises a laterally extending sleeve 41 extending between and having its ends rigidly connected to bosses 39a and 40a of the front and rear bracket members 39 and 40 as by means of the welds 41a. The rockshaft 34 is of a length to extend through the sleeve 41 in which it is received and to which it is connected by the transverse pin 34a and has its ends journalled in the front and rear bearings 32 and 33 of the carriage 27.

The front bracket member 39 of the rocker member 29 has a body portion formed by an upright substantially flat plate 42 of a substantially triangular shape and having one corner thereof pointing generally downwardly. The front bracket member 39 also includes the above-mentioned front boss 39a located at the lower corner of the triangular plate 42 and front bearing bosses 44 and 45 located at the two upper corners of this triangular plate. The rear bracket member 40 of the rocker member 29, likewise, comprises a body portion formed by a substantially triangular flat plate 46 having the lower corner boss 40a and two rear bearing bosses 47 and 48 located at the two upper corners of this triangular plate.

The front and rear bosses 39a and 40a located at the lower corners of the bracket members 39 and 40, are rigid with the sleeve 41 of the rocker member 29, and hence, move with the rockshaft 34. The bearings 44 and 47 of the front and rear bracket members 39 and 40, constitute the upper bearings of the rocker member 29 and provide a pivotal mounting for the gripping unit 28, as will be further explained hereinafter. The bearings 45 and 48 of the front and rear bracket members 39 and 40 constitute the outer bearings by which the cylinder devices 30 and 31 are connected with the bracket members of the rocker member 29. From the above-described locations of the bearings 32, 44 and 45 of the front bracket member 39 and the bearings 33, 47 and 48 of the rear bracket member 40, it will be seen that the three bearings of each bracket member constitute a pivot group having a substantially inverted-triangle shape.

The cylinder devices 30 and 31 are double acting devices having flexible fluid pressure supply conduits 50 and 51 (see Fig. 4) connected with the ends of the cylinders thereof and include piston rods 52 and 53 projecting from the cylinders and provided with forked ends 52a and 53a which straddle the bearings 45 and 48 and are pivotally connected with the bracket members 39 and 40 by pivot pins 45a and 48a extending through these bearings.

The actuation of the rocker members 29 will be described in detail hereinafter but, from the construction and general arrangement thus far described, it will be understood that these rocker members are swingable toward and away from the die punch 12 by the pairs of cylinder devices 30 and 31 of the carriages 27, and that during such swinging of the rocker members the two upper pivots of the bracket members 39 and 40 move along an arcuate path extending above and across the lower pivot as a center.

*The work gripping units*

The work gripping units 28 of the pulling units 13 and 14 are identical, and hence, only one of these gripping units need be described in detail. As shown in Figs. 5, 8, 11 and 12, the gripping unit 28 comprises a grip head 54 and a cylinder carrier 55 by which the grip head is supported and operated. The grip head 54 is elongated in the transverse direction of the workpiece 17 and is provided with a number of work gripping chucks 56 distributed therealong for gripping engagement with the workpiece at correspondingly spaced points thereacross.

The grip head 54 further comprises a laterally elongated rigid bar 58 having a laterally extending dovetail recess 59 therein to which the end or edge portion of the workpiece 17 is admitted through an access slot 60. The jaws of the grip head 54 are formed by a laterally extending grip strip 61 of hardened metal seated in the lower portion of the dovetail slot 59 (see Fig. 12) and a laterally extending row of individual grip blocks 62 located in the upper portion of the dovetail slot and movable toward and away from the grip strip for clamping the intervening portion of the workpiece 17 against the latter. A pair of hardened guide strips 63 and 64, of an angular cross-sectional shape, are located in the access slot 60 of the bar 58 and define a guide slot 65 therebetween by which the end portion of the workpiece is guided into position between the lower grip strip 61 and the grip blocks 62.

The grip blocks 62 of the grip head 54 constitute portions of the individual chucks 56 and one of the grip blocks 62 is associated with each of the chuck cylinders 66 and is carried and actuated by the lower end of a piston rod 67 projecting from such cylinder. The cylinders 66 are mounted on and secured to the upper surface of the bar 58 with the piston rods 67 extending through openings 67a of this bar into the dovetail slot 59. A piston 68 located in each of the chuck cylinders 66 is connected with the upper end of the piston rod 67 and has a downward power stroke in response to pressure fluid supplied through a flexible conduit 69 for moving the associated grip block 62 toward the grip strip 61 for clamping the workpiece therebetween. A compression spring 70 provided in each of the chuck cylinders 66 and located beneath the piston 68, produces an upward return stroke of the latter and a release movement of the grip block 62 away from the grip strip 61.

The cylinder carrier 55 of the work gripping unit 28 comprises a block-like rigid body 71 having a pair of laterally spaced front and rear arms 72 and 73 integrally connected therewith and projecting therefrom longitudinally of the machine 10 and toward the die punch 12. The arms 72 and 73 are provided at their free ends with bosses 72a and 73a in which transversely projecting front and rear pivot pins 74 and 75 are mounted and secured by means of anchor pins 76. The portions of the pivot pins 74 and 75 which project from the arms 72 and 73 define trunnions 74a and 75a which are journalled in the front and rear upper bearings 44 and 47 of the front and rear bracket members 39 and 40 of the rocker member 29. From the construction just described above, it will be seen that the engagement of the trunnions 74a and 75a in the bearings 44 and 47 of the rocker member 29 mounts the work gripping unit 28 between the bracket members 39 and 40 for the above-mentioned swinging movement relative to the die punch 12.

The cylinder carrier 55 is constructed so as to embody a plurality of laterally spaced fluid pressure cylinders, in this instance three such cylinders, comprising a center cylinder 77 and a pair of side cylinders 78 and 79 disposed on opposite sides of the center cylinder. The center cylinder 77 is a double acting cylinder having a piston 80 operable therein in response to pressure fluid supplied to opposite ends of this cylinder through flexible conduits 81 and 82. The side cylinders 78 and 79 are, likewise, double acting cylinders having pistons 83 and 84 operable therein in response to pressure fluid supplied to opposite ends of these cylinders through flexible conduits 85 and 86.

The grip head 54 is connected with the cylinder carrier 55 for actuation therefrom, as will now be described. For this purpose, the cylinder carrier 55 is provided with a projecting bracket 87 extending toward the die punch 12 and having a bearing pad 88 thereon. A piston rod 89 connected with the piston 80 projects from the center cylinder 77 in overlying relation to the bracket 87 and is provided at the end thereof with a substantially T-shaped head 90. A yoke 91 is connected with the piston rod 89 and is formed by a pair of complemental upper and lower yoke members 91a and 91b (see Fig. 12) which are secured to the head 90 of the piston rod by means of the screws 92. The yoke 91 is supported and guided by the bracket 87 by a sliding engagement of the flat bearing surface 93 of the lower yoke member 91b on the bearing pad 88.

The bar 58 of the grip head 54 is provided, at an intermediate point thereof and on the side thereof opposite the access slot 65, with a projecting substantially T-shaped bearing head 94. The yoke 91 is provided with a substantially T-shaped bearing pocket 95 in which the bearing head 94 engages for establishing a supporting and operating connection between the grip head 54 and the cylinder carrier 55. The T-shaped bearing head 94 comprises a curved head portion 94a and a web portion 94b forming a connecting stem between the head portion 94a and the bar 58. The upper and lower yoke members 91a and 91b are provided with curved internal bearing surfaces 96 and 97 formed by inserts 98 of antifriction material and against which the curved head portion 94a has bearing engagement. The lower yoke member 91b is also provided with a flat antifriction bearing insert 99 on which the flat lower bearing surface 100 of the web portion 94b has rockable bearing engagement.

The upper and lower yoke members 91a and 91b are connected together by means of screws 101 which extend through arcuate clearance slots 102 in the web portion 94b of the bearing head 94. The lower yoke member 91b is also provided with an arm projection 103 which extends into a position beneath the bar 58 and is provided at the end thereof with a boss or eye 104 having a pivot opening 104ª therein. A pivot pin 105 is connected with the bar 58 by means of a threaded pin portion 105ª and extends in depending relation to the bar and engages in the pivot opening 104ª on a vertical axis 106 which intersects the central longitudinal axis 107 of the workpiece 17 and of the machine 10.

The location of the pivot pin 105 is such that the axis 106 also intersects the workpiece 17 at the inner end of the guide slot 65 or, in other words, at the point where the workpiece emerges from between the grip elements 59 and 61 of the chuck devices 66. The bar 58 has bearing engagement with the boss 104 of the projecting arm 103 through an intervening washer 108 located on the pivot pin 105. The bar 58 is also confined, with respect to the arm 103, by means of a second washer or head 109 provided on the pivot pin 105 and engaging the underside of the boss 104.

From the construction just described above for the supporting and operating connection for the grip head 54, it will be seen that the yoke 91 and the T-shaped bearing head 94 form a swivel connection between the grip head and the piston rod 89, such that the grip head will be capable of tilting substantially in the plane of the workpiece 17 and relative to the axis of the transverse rockshaft 34 and the transverse common pivot axis 110 of the pivot pins 74 and 75 of the cylinder carrier 55. By reason of the substantially T shape of the bearing head 94 and its engagement in the T-shaped bearing pocket of the yoke 91, the operating connection between the grip head 54 and the cylinder carrier 55 also provides for the transmission of a heavy pulling force between the cylinder carrier and the grip head for application to the workpiece 17 by the latter as a stretching force.

It will also be seen that in this supporting and operating connection between the grip head 54 and the cylinder carrier 55, the swiveling or tilting movement of the grip head relative to the cylinder carrier takes place by a swinging of the grip head about the axis 106 of the pivot pin 105 and by a sliding of the curved head portion 94ª of the bearing head 94 in the curved transverse slot portion of the pocket 95 of the yoke 91. The pivot pin 105 of the grip head engages in the pivot opening 104ª of the boss 104 with a sufficiently loose fit so that the strong pulling forces, which are applied to the grip head, will be transmitted through the T-shaped bearing head 94 rather than through this pivot pin.

Figure 11:
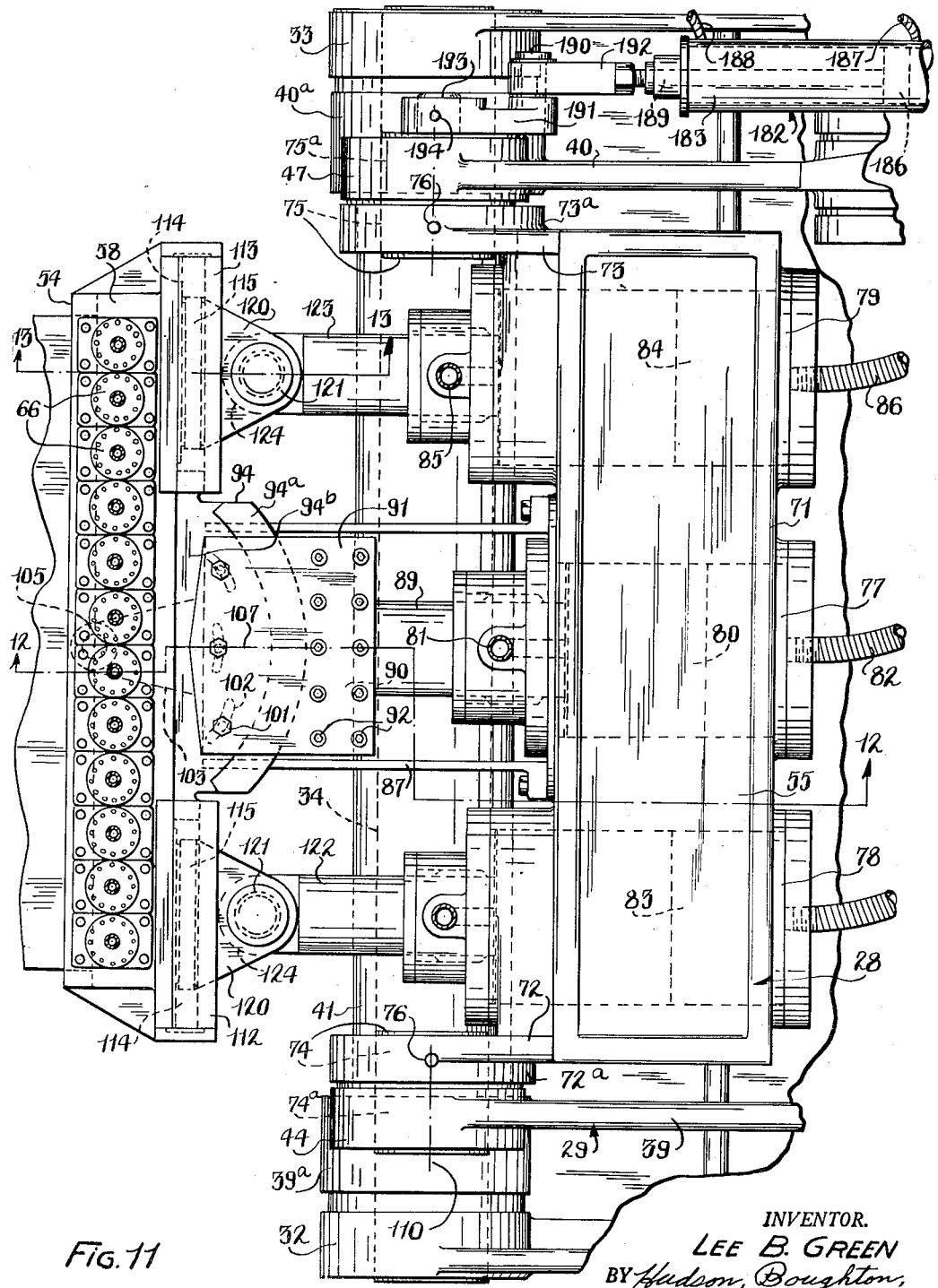
Fig. 11 is a plan view of one of the work gripping units and showing the mounting thereof on the machine.

In addition to the T-shaped bearing head 94, the bar 58 is also provided with a pair of front and rear side bearing members 112 and 113 located on opposite sides of the bearing head 94. The side bearing members 112 and 113 form flexible operating connections between the grip head 54 and the front and rear cylinder devices 78 and 79 of the cylinder carrier 55. As shown in Figs. 11 and 13, each of the side bearing members 112 and 113 comprises a substantially channel-shaped guideway 114 extending longitudinally of the bar 58 and a bearing member 115 having a T-shaped head 116 slidable in such guideway and retained therein by a pair of gibs 117 and 118 of an angular cross-sectional shape and secured to the bar 58 by screws 119. The bearing member 115 is provided with a forked portion 120 carrying a pivot pin 121.

Piston rods 122 and 123, connected with the pistons 83 and 84 of the cylinder devices 78 and 79, extend in substantially parallel relation to the piston rod 89 of the central cylinder device 77. Each of the piston rods 122 and 123 is provided at the end thereof with an eye 124 which extends into the yoke opening of the forked bearing portion 120 and is pivotally secured to the latter by the pivot pin 121.

As has already been indicated above, the carriages 27 of the pulling units 13 and 14 are slidably movable along the guideways 21 of the end frame members 15 and 16. Such travel of the pulling units 13 and 14 on the frame members 15 and 16 moves the work gripping units 28 toward or away from the die punch 12. This travel of the pulling units 13 and 14 is produced by suitable power means which, in this instance, comprises a pair of front and rear lead screws 125 and 126 rotatably supported in suitable bearings 127 of the end frame members and engaging in front and rear nut members 128 and 129 of the carriages 27. The lead screws 125 and 126 are connected at the outer end thereof with a transverse drive shaft 130 through worm gear devices 131 and 132 which are mounted on a support shelf 133 of the end frame member 15. A driving motor 134, suitably mounted on the shelf 133, is connected with the drive shaft 130 and supplies the driving force for propelling the pulling units 13 and 14 along the guideways 21.

*Die punch supporting and operating mechanism*

The die punch 12 is here shown as comprising a die member having a convexly curved work-engaging surface 135 (see Fig. 6) which includes an intermediate portion 135ª of a relatively large radius of convex curvature and end portions 135ᵇ which are curved to a relatively smaller radius of convex curvature. The die punch 12 is mounted in fixed relation on a die carrier 136 which is a saddle-like member having a substantially flat plate-like top portion 136ª and a pair of depending flange members 136ᵇ defining a channel-shaped passage 137 therebetween. The depending flanges 136ᵇ and the passage 137 therebetween extend in a direction transversely of the workpiece 17 and of the machine 10.

Figure 10:
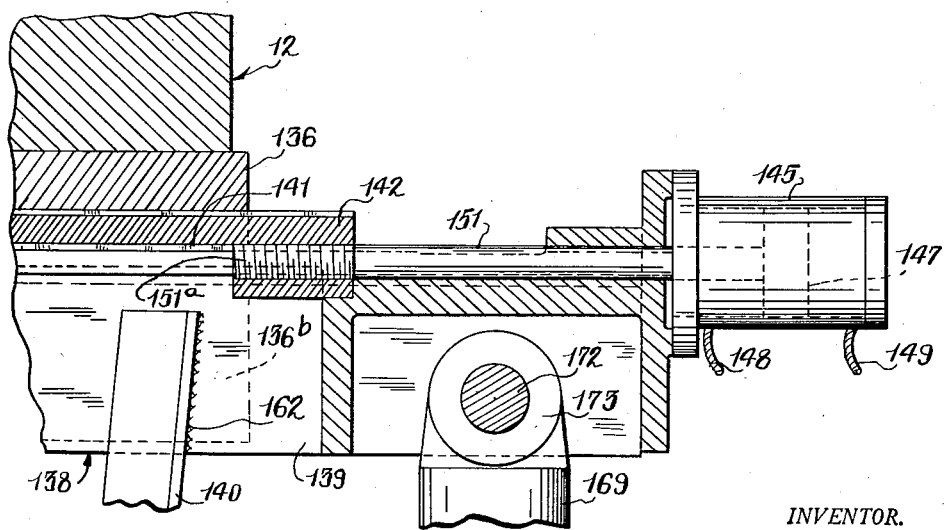
Fig. 10 is a fragmentary transverse section taken substantially on section line 10—10 of Fig. 5.

As shown in the drawings, the machine 10 is provided with supporting and actuating means for the die punch 12 which includes a substantially T-shaped member 138 comprising connected beam and stem portions 139 and 140. The beam portion 139 comprises a member of channel-shaped cross-section extending in a direction transversely of the workpiece 17 and of the machine 10 and having a longitudinal guideway 141 on the top thereof defined by the web portion of the channel-shaped cross-section. The beam portion 139 is of a length to extend through the passage 137 of the die carrier 136 and to project for substantial distances on opposite sides of the die carrier. A slide member 142, which is secured to the die carrier 136 and located in the passage 137 thereof, is slidable on the guideway 141 of the beam member 139 and serves to mount the die punch 12 on the beam member for lateral shifting or reciprocating movement transversely of the machine and relative to the workpiece 17. The slide member 142 is preferably of a length such that the ends thereof project from the ends of the passage 137 of the die carrier 136, as shown in Figs. 7, 9 and 10.

The lateral shifting or reciprocating movement of the die punch 12 on the beam member 139 is produced by a pair of double acting power cylinder devices 144 and 145 which are mounted on this beam member at the opposite ends thereof, as shown in Figs. 2, 5 and 7. Pistons 146 and 147 are operable in these cylinders in response to pressure fluid supplied to opposite ends thereof through flexible conduits 148 and 149 and are connected with the ends of the slide member 142 by piston rods 150 and 151, which have threaded connections with the slide member, as indicated at 150ª and 151ª.

As shown in Figs. 6 and 7, the depending stem portion 140 of the T-shaped support 138 for the die punch 12, extends downwardly into the chamber 18ª of the intermediate frame member 18. A pair of spaced apart upright transverse walls 152 and 153 of the intermediate frame member 18 carry guide plates 154 and 155 which define an upright guideway 156 lying in a plane extending transversely of the machine 10. The depending stem portion 140 is operable in the upright guideway 156 and is provided with bearing surfaces or pads 157 and 158 on opposite sides and adjacent the lower end thereof which have slidable bearing engagement with the adjacent faces of the bearing plates 154 and 155.

The bearing plates 154 and 155 are mounted on the walls 152 and 153 of the intermediate frame member 18 by means of screws 159 whose inner ends form guide pins upon which these bearing plates are adjustably movable in a direction toward and away from each other. Two sets of adjusting screws 160ª and 160ᵇ extend through openings of the wall 152 and engage the bearing plate 154 for shifting the latter on the guide pin portions of the support screws 159 for variably adjusting the width of the guide passage 156. The screws constituting the set 160ª have threaded engagement in openings of the wall 152 and, when adjusted inwardly, act as pushing members for moving the bearing plate 154 toward the bearing plate 155. The screws constituting the set 160ᵇ extend through plain openings of the wall 152 and have threaded engagement with the bearing plate 154, such that when rotated clockwise in the plain openings, the latter screws act as pulling members and move the bearing plate toward the wall 152.

The stem portion 140 of the T-shaped support member 138 is here shown as formed from a bar of a substantially T-shaped cross-section and which has been bent to substantially U shape, as shown in Fig. 7. The end portions of the bar form the legs of the U shape and are secured to the beam member 139 by welding 162. The intermediate portions of the bar forms the bottom of the U-shaped stem 140 and to which the bearing pads 157 and 158 are secured. The stem portion 140 can be reinforced by an I beam strut 163 extending between the legs of the U shape and secured to such legs by welding.

From the construction just described above for the guideway 156 of the intermediate frame member 18 and the stem portion 140 of the support member 138, it will be seen that this support member will be confined by the guideway for causing the movements of the die punch 12 to take place in a vertical plane extending transversely of the workpiece 17 and of the machine 10. It will also be seen from this construction, that the stem portion 140 of the support member 138 will be capable of a substantially universal shifting movement in the guideway 156, such that the die punch 12 will be capable of movements upwardly and downwardly in the vertical transverse plane and will also be capable of a rocking or tilting movement in this vertical transverse plane by which the die punch can be made to assume a tilted or cocked position, as represented by the broken line showing 12ª in Fig. 7.

The upward movement of the die punch 12 by the support means 138 constitutes a work stroke movement by which the convexly curved surface of the die punch is engaged against the underside of the workpiece 17 for producing an upward bending of the intermediate portion of the workpiece while the latter is being subjected to a stretching force by the gripping units 28. A downward movement of the die punch 12 by the support 138 constitutes a return stroke movement of the die punch. These working and return stroke movements of the die punch are produced or controlled by a pair of upright power cylinder devices 164 and 165 which will be described next.

As shown in Figs. 4, 5 and 7, the power cylinder devices 164 and 165 are spaced apart transversely of the machine 10 and are mounted on the intermediate frame member 18 by front and rear brackets 166 and 167 projecting laterally therefrom. The power cylinder devices 164 and 165 are preferably single acting devices having plungers or rams 168 and 169 operable therein and having an upward power stroke movement in response to pressure fluid supplied to the lower ends of these devices through the conduits 170. The rams 168 and 169 project from the upper ends of the cylinder devices 164 and 165 and have operative connection with the beam member 139 of the support means 138 at points spaced apart laterally of the machine.

The operating connection between the ram 169 of the power cylinder device 165 and the beam member 139 is a fixed pivotal connection formed by a pivot pin 172 extending through the beam member 139 and through an eye 173 carried by the upper end of the ram 169 and projecting upwardly into the recess of the beam member. The operating connection between the ram 168 of the power cylinder device 164 and the beam member 139 is a slidable connection formed by a bearing shoe 174 rockably mounted on the upper end of this ram and slidable along a guideway 175 defined by the recess of the beam member. The flexible operating connections thus formed between the power cylinder devices 164 and 165 and the beam member 139, permit this beam member and the die punch 12 to assume the tilted or cocked position 12ª, shown in Fig. 7, in response to work stroke movements of different lengths of these power cylinder devices.

When the die punch 12 is of a substantial length in a direction longitudinally of the machine, it may be desirable to provide stabilizing devices or jacks on opposite sides of the support means 138, as shown in Figs. 4, 5 and 9, for assisting the bearing plates 154 and 155 in preventing tilting of the die punch in a direction longitudinally of the machine. These stabilizing jacks are shown in these views of the drawings as comprising upright power cylinder devices 177 having piston rods 178 projecting from the upper ends thereof and engageable with transversely extending bridge members 179 depending from the die carrier 136.

The bridge members 179 are provided at the lower edge thereof with a thrust surface 180 which is convexly curved transversely of the machine 10. The curvature of the thrust surfaces 180 is such that when the die punch 12 is cocked or tilted to an inclined position, as shown in Fig. 7, the piston rods 178 of the stabilizing cylinder devices 177 will remain in supporting engagement with these bearing surfaces.

Swinging of the work gripping units 28 on the rocker embers 29, takes place as an inherent function of the machine 10 during the stretch bending operation and in response to the various forces acting on these gripping units, and this swinging will be more fully explained hereinafter. If desired, however, the machine 10 can be provided with a power means 182 for imparting the swinging movement to the gripping units 28 or for controlling the swinging movement thereof. This power means is identical for both of the gripping units 28 and, therefore, need be described in detail only in connection with the pulling unit 13.

As shown in the drawings (Figs. 11 and 14), the power means 182 comprises a pressure fluid cylinder 183 which has one end thereof pivotally connected with a bracket 184 by a pivot pin 185. The cylinder 183 is mounted on the rocker member 29 by having the bracket 184 welded, or otherwise secured, to the rear bracket member 40 of this rocker member. The cylinder 183 is a double acting cylinder having a piston 186 operable therein and is provided with flexible pressure fluid supply conduits 187 and 188 which communicate with the cylinder on opposite sides of the piston. A piston rod 189 is pivotally connected with a crank pin 190 of a crank arm 191 as by a yoke 192 on the end of the piston rod.

Figure 8:
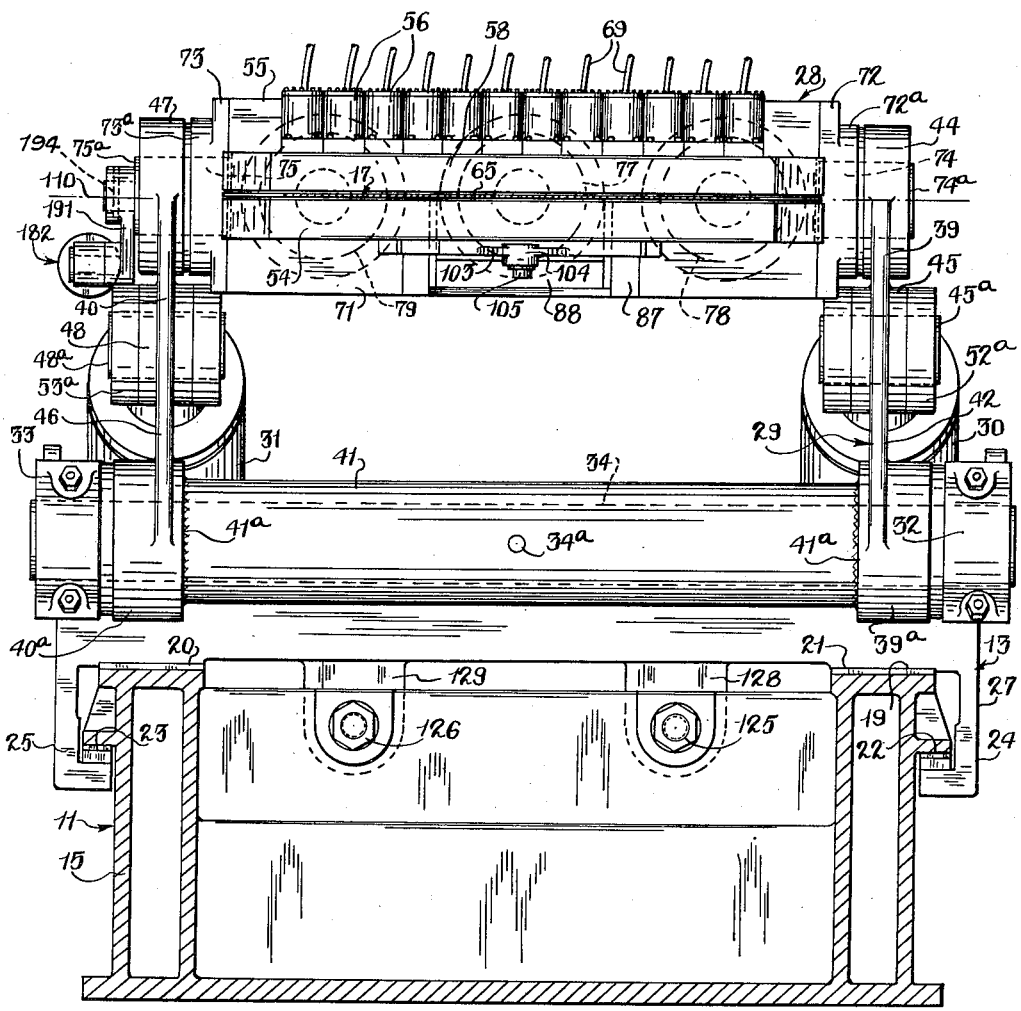
Fig. 8 is a vertical transverse section taken through the machine and looking toward the inner end of one of the work gripping units, the view being taken approximately on section line 8—8 of Figs. 2, 4 and 5.
Figure 23:
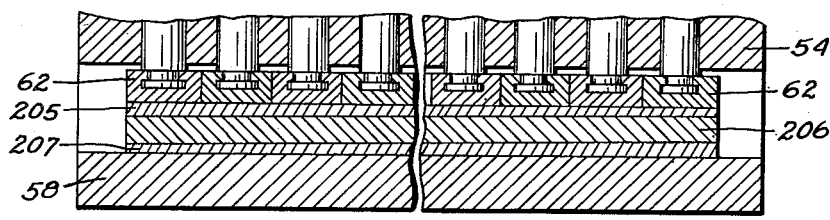
Fig. 23 is a partial transverse vertical section taken through the modified grip head of Fig. 22 substantially as indicated by section line 23—23 thereof.

The crank arm 191 is secured to a reduced axial extension 193 of the rear pivot pin 75ª of the rocker member 29, as by means of a transverse key or pin 194 (see Figs. 8 and 11). With the arrangement of the power device 182, as just described above, it will be seen that since one end of the cylinder 183 is anchored on the rocker member 29 and the piston rod 189 is effective on the pivot pin 75ª of the gripping unit 28 through the crank arm 191, this power device will be capable of swinging the gripping unit 28 in either direction, that is up or down, on the rocker member 29 and about the common axis 110 of the pivot pins 74 and 75.

Detailed operation of machine

The stretch bending machine 10 is shown in Figs. 1 and 2 with the components thereof substantially in the position which they occupy at the beginning of a stretch bending operation. As shown in Figs. 1 and 2, the workpiece 17 has been placed in the machine and its opposite ends have been gripped by the chuck devices of the gripping units 28 and the die punch 12 has been advanced, that is moved upwardly, somewhat from its fully retracted position to merely engage the curved surface of the punch with the underside of the workpiece.

In bringing the machine 10 to the condition of readiness shown in Figs. 1 and 2, the workpiece 17 is lowered, or otherwise moved, into a position extending across the die punch 12. The gripping units 28 are advanced toward the die punch 12 to engage the ends of the workpiece in the guide slots 65 of the grip heads 54 for gripping engagement by the grip elements thereof.

During this engagement of the ends of the workpiece in the grip heads 54, the gripping units 28 can be manipulated relative to the die punch 12 with various movements imparted thereto, such as by an inward movement of the carriage 27 along the guideway 21 produced by the lead screws 125 and 126; a swinging of the gripping unit 28 inwardly or outwardly relative to the die punch by rocking of the rocker member 29 on the carriage 27; or by a swinging of the gripping unit 28 on the rocker member 29 by means of the power cylinder device 182. Movement of the grip head 54, toward or away from the die punch 12, can also be produced by means of the cylinder devices 77, 78 and 79 of the gripping unit 28. When the ends of the workpiece 17 have thus been engaged in the grip heads 54 of the gripping units 28 and the chuck cylinders 66 have caused the grip blocks 62 to clamp the workpiece, the machine will then be ready for the stretch bending operation.

In carrying out the stretch bending operation, the stretching force is applied to the workpiece 17 through the gripping units 28 and is produced by the action of any one of several power devices or by any desired combinations of the forces produced by these various power devices. For example, the stretching force can be produced by sliding movement of the carriages 27 along the guideways 21 in a direction away from the die punch 12 by the lead screws 125 and 126. The stretching force can also be produced by actuation of the power cylinder devices 77, 78 and 79 of the gripping units in a direction to move the grip heads 54 away from the die punch 12. The stretching force is also produced by the action of the power cylinder devices 30 and 31 in rocking the rocker members 29 inwardly and rearwardly relative to the die punch 12 and by which the end portions of the workpiece are wrapped upon and drawn downwardly around the curved end portions of the die punch.

During one manner of operation of the machine 10, the cylinder devices 77, 78 and 79 are used to apply an initial tension to the workpiece 17 after the ends thereof have been gripped by the grip heads 54. Thereafter the stretching force is produced primarily by a combined movement of the slide means, that is the carriage 27, on the guideway 21 and by a rocking of the rocker member 29 on the carriage by the power cylinder devices 30 and 31.

Further use of the cylinder devices 77, 78 and 79 can, of course, be made during this stretch bending operation to apply additional stretching force to the workpiece instead of, or supplemental to, the stretching force being supplied by the combined movements of the carriage 27 and the rocker member 29. Such a stretching force supplied by the cylinder devices 77, 78 and 79, or by any selected individual ones of these cylinder devices, supplemental to the stretching force produced by the combined movements of the carriage 27 and the rocker member 29, may be desirable for maintaining a uniform rate of stretch in all portions of the workpiece or for producing desired unequal rates of stretch in different portions of the workpiece.

While the workpiece 17 is being subjected to the above described stretching force transmitted thereto through the gripping units 28, the workpiece is simultaneously subjected to a bending force applied thereto by the die punch 12. This bending force is produced by the power cylinder devices 164 and 165, supplemented if desired by the stabilizing cylinder devices 177, by which the die punch is moved upwardly and causes the tensioned work piece 17 to be bowed upwardly and to conform to the convex curvature of the die punch.

During this combined bending and stretching operation on the workpiece 17, the die punch 12 is moved upwardly from its full line position of Figs. 1, 4 and 6 to substantially its dotted line position 12$^b$ of these views which represents the position corresponding with the fully shaped condition of the workpiece. During this stretch bending operation, the rocker member 29 is rocked toward the die punch 12 and moves from its initial full line position, shown in Fig. 6, through an intermediate broken line position 29$^a$ to substantially its final broken line position 29$^b$ which corresponds with the fully shaped condition of the workpiece. During this rocking movement of the rocker member 29, the carriage 27 is moved back and forth along the guideway 21 usually by being first moved along the guideway in a direction away from the die punch 12 for a distance represented by the travel line 195. This travel line 195 is indicated by arrowheads as extending in a direction away from the die punch 12 and represents travel of the carriage 27 in this direction for a distance corresponding with the space between the initial and intermediate positions of the axis of the rockshaft 34. The subsequent travel of the carriage 27 along the guideway 21 is in a direction toward the die punch 12 and is represented by the travel line 196. This latter travel line 196 has arrowheads indicating travel of the carriage 27 in a direction toward the die punch 12 and represents travel in this direction for a distance corresponding with the space between the intermediate position of the axis of the rockshaft 34 and its final position.

The gripping unit 28 swings on its pivotal mounting in the rocker member 29 while this rocking of the rocker member and back and forth movement of the carriage 27 are taking place. This swinging movement of the gripping unit 28 is a resultant swinging movement which carries the gripping unit inwardly and downwardly relative to the die punch 12 and also causes the gripping unit to move from its substantially horizontal full line position, shown in Fig. 6, to its substantially upright broken line final position 28$^a$.

It will be observed that the direction of application of the stretching force is changed progressively during the stretch bending operation, such that the end portions of the workpiece will be substantially always maintained tangent to the curvature of the die punch 12. This is important because the elongation produced in the workpiece will then occur mainly at the point of tangency and will move progressively along the workpiece as the end portions thereof become wrapped around the die punch. When the stretch bending operation is carried out with this progressive change in the direction of application of the stretching force and tangent condition, the elongation will be produced in the workpiece at points thereof which are still free to move relative to the surface of the die punch and only a relatively small amount of elongation will occur in portions of the workpiece which have already been wrapped tightly upon the die punch. By carrying out the stretch bending operation under these conditions, the workpiece will be subjected to a relatively smooth and uniform stretching and bending action with a minimum amount of cramping or chattering of the workpiece on the surface of the die punch and with a minimum amount of tearing or excessive straining of any portions of the workpiece.

During the upward work stroke movement of the die punch 12 in producing the desired bending of the workpiece 17, the die punch can be moved with a straight upward movement throughout its full work stroke travel or, if desired, can be subjected to either a lateral reciprocating movement or a lateral tilting movement, or any combination of these reciprocating and tilting movements, at any point during the upward work stroke travel. Such a tilted condition of the die punch is represented by the broken line position 12ᵃ of Fig. 7 and results from an increased upward actuating movement produced by the power cylinder device 164 relative to the movement produced by the power cylinder device 165. The reciprocation of the die punch 12, during its upward power stroke movement, can be either a relatively rapid vibratory reciprocating movement or can be a slow or gradual reciprocating movement produced by appropriately timed power strokes of the cylinder devices 144 and 145.

These tilting and reciprocating movements of the die punch 12 during the upward working stroke thereof, may be desirable for controlling the stretching and bending being produced in the workpiece and for causing the desired amount of stretching or bending to occur in any desired portion of the workpiece. These tilting and reciprocating movements of the die punch can also be used to facilitate the elongating movement of the workpiece over the curved surfaces of the die punch, such that the stretch bending operation will be carried out without seizing or chattering of the workpiece on the die punch. The tilting and reciprocating movements of the die punch can also be used for producing a desired camber or unequal stretch formation in one side portion of the workpiece in comparison with the stretch formation produced in the other side portion of the workpiece. Such a cambered shape in the completed workpiece may be desirable where the workpiece is to form one of a series of overlapping sections of a tapered hollow body.

During a combined upward and lateral tilting work stroke movement of the die punch 12, the stem portion 140 of the movable support 138 will be confined between the bearing plates 154 and 155 of the intermediate frame section 18, but will be capable of a more or less universal slidable shifting movement between these bearing plates. During the lateral or reciprocating movements of the die punch 12 on the beam member 139, the slide member 142 with the die carrier 136 thereon, will have a sliding movement back and forth on the guideway 141 of the beam member produced by the pistons 146 and 147 of the power cylinder devices 144 and 145 acting on this slide member through the piston rods 150 and 151.

This lateral movement of the die punch 12 transversely of the machine 10 can be used to initially locate the punch relative to the workpiece 17 after the latter has been gripped by the gripping units 28 and just prior to the beginning of the stretch bending operation. In this way, the die punch 12 can be quickly located correctly with respect to the width of the workpiece for the most satisfactory performance of the stretch bending operation without requiring re-chucking of the workpiece in the grip heads 54. In the absence of a provision for such a lateral movement of the die punch 12, it may be necessary, in frequent instances, to release the gripping action of the grip heads on the workpiece and to re-chuck the workpiece in the grip heads in order to align the workpiece correctly with the die punch. This re-chucking of the workpiece in the grip heads consumes considerable time and causes damage to the end portions of the workpiece by the grip elements of the chuck head.

With respect to the functions of the cylinder devices 77, 78 and 79 of the gripping unit 28, it should also be pointed out that these cylinder devices increase the range of stretching movement for the grip heads 54 and make it possible to complete a desired stretch bending of a given workpiece in a single stretch bending operation without re-chucking of the workpiece when a sufficient stretching movement would not be obtainable from the combined movements of the carriage 27 and the rocker member 29. These cylinder devices 77, 78 and 79 also perform a very important stretching function in cases where it is desirable to produce greater elongation in one side portion of the workpiece than in the opposite side portion.

Some of these different functions of the cylinder devices 77, 78 and 79 of the gripping unit 28 are illustrated in Figs. 17 to 21 inclusive. In Fig. 17, these cylinder devices are shown as holding the grip head 54 in a position substantially at right angles to the longitudinal axis of the workpiece 17 and of the machine 10 and this setting of these cylinder devices represents a condition in which both side portions of the workpiece are subjected to substantially the same amount of elongation.

The cylinder devices, 77, 78 and 79 also facilitate the chucking operation where the workpiece, upon which the stretch bending operation is to be carried out, has a beveled or oblique end as distinguished from a square or right-angle end, as shown in Figs. 18 and 19. In Fig. 18, the workpiece 200 is one in which the end to be gripped extends on a bevel, such that the side edge 200ᵃ is longer than the side edge 200ᵇ. In order to properly grip such a bevel end, the cylinder devices 78 and 79 are actuated so as to tilt the grip head 54 to an inclined position relative to a transverse line 201 which is substantially normal to the longitudinal axis 202 of the workpiece.

Fig. 19 shows the reverse condition in which the end to be gripped of a workpiece 203 has an oppositely extending bevel and the cylinders 78 and 79 have been actuated to impart an oppositely inclined tilted condition to the grip head 54.

During such tilting of the grip head 54 by the cylinder devices 78 and 79, the grip head swings about the axis of the pivot pin 105 and the curved head portion 94ᵃ of the T-shaped head 94 oscillates in the transverse arcuate guideway of the yoke 91.

Figs. 20 and 21 illustrate the functioning of tthe cylinder devices 77, 78 and 79 in stretch bending operations where one edge portion of the workpiece 17 is being subjected to greater elongation than the opposite edge portion. In this type of a stretch bending operation, these cylinder devices produce a tilted condition of the grip head 54 depending upon the extent of increased elongation desired for either edge portion of the workpiece and which tilted condition of the grip head 54 may vary from zero to 10° or more relative to a transverse line 204 extending at substantially right angles to the longitudinal axis of the workpiece.

In Fig. 20, the cylinder device 78 is producing an increased elongation in the corresponding edge portion 205ᵃ of the workpiece 205. In Fig. 21, the cylinder device 79 is producing an increased elongation in the corresponding edge portion 205ᵇ of the workpiece 205.

The increased elongation for one edge portion of a workpiece with respect to the opposite edge portion, may be desirable in a workpiece which is of a tapered thickness, as is represented in Fig. 16 for the workpiece 205. In Fig. 20, the edge portion 205ᵃ may be the relatively thicker portion of the workpiece which is being subjected to the increased elongation and, similarly, in Fig. 21, the edge portion 205ᵇ is the relatively thicker portion being subjected to increased elongation.

Fig. 22 shows the grip head 54 of the work gripping units 28 adapted for use with the tapered thickness workpiece 205. This is accomplished by substituting in the dovetail slot 59 a grip strip 206 which is of a uniform thickness but slightly thinner than the grip strip 61 and placing under the grip strip 206 a tapered backing strip 207. The backing strip 207 has the same taper as the workpiece 205, and preferably is a strip cut from the end of the tapered workpiece and located in the slot 59 with its taper disposed in reverse relation to the taper of the workpiece.

Conclusion and advantages

When the die punch 12 and the work gripping units 28 have reached their final positions explained above in connection with Fig. 6 and the stretch bending operation being performed on the workpiece 17 has been completed, the chuck cylinders 66 are deenergized to release the hold of the grip elements 61 and 62 on the workpiece. The die punch 12 is then moved through a further upward travel to lift the completed workpiece and disengage the ends thereof from the grip heads 54. The completed workpiece is then removed from the die punch 12, after which the pressure fluid is released from the cylinder devices 164 and 165 to permit a downward return stroke movement of the die punch by gravity.

During the return stroke movement of the die punch 12, the carriages 27 are returned to their initial positions by the lead screws 125 and 126 and the rocker members 29 are also swung upwardly and outwardly relative to the die punch to their initial positions by the cylinder devices 30 and 31. By actuation of the power cylinder devices 182, the gripping units 28 are then swung to their substantially horizontal initial positions shown in Fig. 1. When these return movements have been accomplished, the bending machine 10 is then ready to have another of the workpieces 17 placed therein for the next succeeding stretch bending operation.

From the foregoing description and the accompanying drawings, it will now be readily understood that this invention provides a stretch bending method and apparatus in which the shaping of a metal plate, or other workpiece, can be rapidly and efficiently carried out by a simultaneous stretching and bending thereof. It will also be seen that by reason of the downward and inward swinging movement which is imparted to the gripping units 28 by the rocker members 29, the die punch 12 need have only a relatively small amount of forward or upward work stroke movement for accomplishing the stretch bending operation. This results in an important advantage because, when only a relatively small amount of work stroke movement is required for the die punch, the machine can be kept relatively low in height, which is decidedly advantageous from the standpoint of building, housing and maintaining the machine and also from the standpoint of facility in loading and unloading the machine with respect to the workpieces being operated upon. Since many other advantages of this stretch bending method and apparatus have already been explained above, they need not be here repeated.

Although the novel stretch bending method and apparatus of this invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. The method of stretch bending a metal workpiece which comprises, applying a stretching force to opposite ends of the workpiece and simultaneously bending the workpiece around a convexly curved die, said simultaneous stretching and bending being accomplished by forcing said die against an intermediate portion of the workpiece and simultaneously stretchingly pulling said opposite ends around curved portions of the die, progressively changing the direction of application of the stretching force such that the end portions of the workpiece are always substantially tangent to said curved portions of the die, tilting said die in a plane extending transverse to the general direction of the stretching force, and reciprocating said die transversely to the general direction of the stretching force and crosswise of the workpiece while the die is being maintained tilted and simultaneously with the application of the stretching and bending forces to said workpiece.

2. In stretch bending apparatus of the kind having gripping devices engageable with the ends of a workpiece and movable apart for applying a stretching force to the workpiece, means defining a first guideway lying substantially in a plane extending transversely to the general direction of said stretching force, a support having a follower portion in guiding engagement with said first guideway and having guided movement in two directions in said first guideway, means defining a second guideway on sad support and lying substantially in said transverse plane, a die carrier having a die thereon and movable along said second guideway, a pair of spaced power cylinder devices located substantially in said transverse plane adjacent opposite ends of said first guideway, said cylinder devices being operable to move said support for advancing said die against an intermediate portion of said workpiece and also being effective to tilt said support in said transverse plane, and other power cylinder devices on said die support adjacent the ends of said second guideway and operable to move said die carrier along said second guideway.

3. In stretch bending apparatus of the kind having gripping devices engageable with the ends of a workpiece and movable apart for applying a stretching force to the workpiece, means defining a guideway located substantially in a plane extending transversely to the general direction of said stretching force, a support adapted to receive a die thereon for engagement with an intermediate portion of said workpiece, said support comprising rigidly connected beam and stem portions lying substantially in said plane and said stem portion having a freedom of movement in said guideway providing for both an advance movement and a tilting movement of said support substantially in said plane, and actuating means comprising a pair of power cylinder devices engaging said beam portion at spaced points thereof and operable to cause said advance and tilting movements of said support.

4. Stretch bending apparatus as defined in claim 3 in which said guideway is defined by a pair of spaced apart substantially flat bearing plates and said stem portion has substantially flat bearing surfaces thereon and is substantially universally slidable in said transverse plane and between said bearing plates.

5. In a stretch bending apparatus of the kind having means for applying a stretching force to an elongated workpiece including gripping devices engageable with opposite ends of such a workpiece, means defining a first guideway located substantially in a plane extending transversely to the general direction of said stretching force and including a guide space elongated in two directions of said plane, a support comprising rigidly connected beam and stem portions lying substantially in said plane, means defining a second guideway on said beam portion and extending longitudinally thereof, a die carrier adapted to receive a die thereon and being movable along said second guideway, said stem portion having guiding engagement with said first guideway for movement in two directions in said guide space and providing for advance movement of said support for engaging said die against an intermediate portion of said workpiece and for tilting of said support with said die carrier and die thereon, power cylinder means having operative connection with said support and operable to cause said advance movement and said tilting of said support and die, and a pair of power devices mounted on siad beam adjacent the ends thereof and having operative connection with said die carrier for moving the same along said second guideway.

6. In stretch bending apparatus of the kind having means for applying a stretching force to an elongated workpiece including gripping devices engageable with opposite ends of such a workpiece, means defining a first guideway located substantially in a plane extending transversely to the general direction of said stretching force and including a guide space extending vertically and laterally in said plane, a support comprising rigidly connected transverse beam and depending stem portions lying substantially in said plane, means defining a second guideway on said beam portion and extending longitudinally thereof, a die carrier adapted to receive a die thereon and being movable along said second guideway, said stem portion having guiding engagement with said first guideway for movement in two directions in said guide space and providing for upward movement of said support for engaging said die against an intermediate portion of said workpiece and for tilting of said support with said die carrier and die thereon, a pair of upright power cylinder devices engaging said beam portion at spaced points and operable to cause said advance and tilting movements of said support, and a second pair of power cylinder devices mounted on said beam adjacent the ends thereof and having operative connection with said die carrier for moving the same along said second guideway.

7. In stretch bending apparatus of the kind having power actuated convex forming die means movable against a workpiece extending thereacross, means defining an elongated guideway extending laterally away from said die means, a carriage movable endwise along said guideway, power means operable to cause such endwise movement of said carriage, a gripping unit adapted to grip said workpiece, rocker means pivoted on said carriage by a first pivot means located adjacent the end of the carriage nearest said die means, said rocker means being disposed with the lower portion thereof mounted on said first pivot means and with the upper major portion of such rocker means disposed above said first pivot means, power cylinder means pivoted on said carriage by a second pivot means located adjacent the remote end of said carriage, and a third pivot means mounting said gripping unit on said upper major portion of said rocker means for swinging movement relative to the rocker means and for translatory movement by said rocker means, said power cylinder means having pivotal connection with said upper major portion of said rocker means and being operable to rock said rocker means about said first pivot means toward and away from said die means, said third pivot means and said pivotal connection being movable along an arcuate path located above said first pivot means during such rocking of said rocker means.

8. In stretch bending apparatus of the kind having power actuated convex forming die means movable against a workpiece extending thereacross, means defining an elongated guideway extending laterally away from said die means, a carriage movable endwise along said guideway, power means operable to cause such endwise movement of said carriage, a gripping unit adapted to grip said workpiece, rocker means pivoted on said carriage by a first pivot means located adjacent the end of the carriage nearest said die means, said rocker means being disposed with the lower portion thereof mounted on said first pivot means and with the upper major portion of such rocker means disposed above said first pivot means, power cylinder means pivoted on said carriage by a second pivot means located adjacent the remote end of said carriage, and a third pivot means mounting said gripping unit on said rocker means for swinging movement relative to the rocker means and for translatory movement by said rocker means, said power cylinder means having pivotal connection with said upper major portion of said rocker means and being operable to rock said rocker means about said first pivot means toward and away from said die means, said rocker means comprising a pair of bracket members spaced apart transversely of said carriage and said first pivot means being a common pivot means for said bracket members, said third pivot means and said pivotal connection being movable along an arcuate path located above said first pivot means during such rocking of said rocker means.

9. Stretch bending apparatus as defined in claim 8 in which said first pivot means is formed in part by a transverse pivot shaft means rigidly connecting said pair of bracket members.

10. In stretch bending apparatus of the kind having power actuated convex forming die means movable against a workpiece extending thereacross, means defining an elongated guideway extending laterally away from said die means, a carriage movable endwise along said guideway, power means operable to cause such endwise movement of said carriage, a gripping unit adapted to grip said workpiece, rocker means pivoted on said carriage by a first pivot means located adjacent the end of the carriage nearest said die means, power cylinder means pivoted on said carriage by a second pivot means located adjacent the remote end of said carriage, and a third pivot means mounting said gripping unit on said rocker means for swinging movement relative to the rocker means and for translatory movement by said rocker means, said power cylinder means having pivotal connection with said rocker means and being operable to rock said rocker means about said first pivot means toward and away from said die means, said rocker means comprising a structure having substantially the shape of an inverted triangle with said first pivot means being located substantially at the lower apex of said triangle and said third pivot means and said pivotal connection being located substantially at the two upper corners of said triangle.

11. In stretch bending apparatus of the kind having power actuated convex forming die means movable against a workpiece extending thereacross, means defining an elongated guideway extending laterally away from said die means, a carriage movable along said guideway, power means operable to cause such movement of said carriage, a gripping unit adapted to grip said workpiece, rocker means pivoted on said carriage by a first pivot means, power cylinder means pivoted on said carriage by a second pivot means spaced from said first pivot means in a direction along said guideway, and a third pivot means mounting said gripping unit on said rocker means for swinging movement relative to the rocker means and for translatory movement by said rocker means, said power cylinder means having pivotal connection with said rocker means and being operable to rock said rocker means about said first pivot means toward and away from said die means, said rocker means comprising a pair of upright bracket members spaced apart transversely of said carriage and said gripping unit comprising a body portion swingably mounted between said bracket members by said third pivot means said first and third pivot means and said pivotal connection being located on said bracket members so as to constitute a pivot group having a substantially inverted-triangle shape with said first pivot means located substantially at the lower apex of the triangle and with said third pivot means and said pivotal connection being located substantially at the two upper corners of the triangle.

12. In stretch bending apparatus of the kind having power actuated convex forming die means movable against a workpiece extending thereacross, means defining an elongated guideway extending laterally away from said die means, a carriage movable along said guideway, power means operable to move said carriage along said guideway, rocker means pivoted on said carriage by a first pivot means and comprising a pair of upright bracket members spaced apart transversely of said carriage, power cylinder means pivoted on said carriage by a second pivot means spaced from said first pivot means in the direction of said guideway, a gripping unit comprising a body swingably mounted between said bracket members by a third pivot means and a grip head elongated in a direction transversely of said carriage, said grip head being adapted to grip said workpiece and being supported by said body for both tiltable and translatory movement relative thereto, a group of cylinders carried by said body and disposed in parallel relation in a row extending transversely of said carriage, and pistons operable in said cylinders and having pivotal connection with said grip head at spaced points along the latter for imparting the relative tilting and relative translatory movements to said grip head, said power cylinder means having pivotal connection with said rocker means and being operable to rock said rocker means about said first pivot means toward and away from said die means, said first and third pivot means and said pivotal connection being located on said bracket members so as to constitute a pivot group having a substantially inverted-triangle shape with said first pivot means located substantially at the lower apex of the triangle and with said third pivot means and said pivotal connection being located substantially at the two upper corners of the triangle.

13. In stretch bending apparatus of the kind having power actuated convex forming die means movable against a workpiece extending thereacross and including a curved edge portion, means defining an elongated guideway extending laterally away from said die means, a carriage movable along said guideway, power means operable to move said carriage along said guideway, rocker means pivoted on said carriage by a first pivot means and comprising a pair of upright bracket members spaced apart transversely of said carriage, power cylinder means pivoted on said carriage by a second pivot means spaced from said first pivot means in the direction of said guideway, a gripping unit comprising a body swingably mounted between said bracket members by a third pivot means and a grip head elongated in a direction transversely of said carriage and adapted to grip said workpiece and being supported by said body, said power cylinder means having pivotal connection with said rocker means and being operable to rock said rocker means about said first pivot means toward and away from said die means, said gripping unit having a resultant combined swinging and translatory movement around said curved edge portion of said die means during the stretch bending operation, and another power cylinder device connected between said rocker means and said gripping unit and operable to impart a return swinging movement to said gripping unit relative to said rocker means, said first and third pivot means and said pivotal connection being located on said bracket members so as to constitute a pivot group having a substantially inverted-triangle shape with said first pivot means located substantially at the lower apex of the triangle and with said third pivot means and said pivotal connection being located substantially at the two upper corners of the triangle.

14. In a stretch bending machine, a movable die support, a convex forming die on said die support and having a curved edge portion projecting in overhanging relation beyond said die support, means defining a guideway extending laterally away from said die support, a carriage movable along said guideway, power means adapted to move said carriage along said guideway, rocker means pivoted on said carriage by a first pivot means and comprising substantially triangular upright bracket members spaced apart transversely of said carriage, power cylinder means pivoted on said carriage by a second pivot means and having pivotal operating connection with said rocker means and being operable to swing said rocker means toward said curved side portion of said die, a gripping unit including a grip head elongated in a direction transversely of said carriage and having gripping devices distributed therealong for gripping engagement with an end of a workpiece extending across said die, power means effective on said die support and operable to apply a bending force to said workpiece through said die, and a third pivot means mounting said gripping unit on said rocker means for swinging between said bracket members and for translatory movement by said rocker means, said rocker means having substantially an inverted-triangle shape with said first pivot means located substantially at the lower apex of the triangle and said third pivot means and said pivotal connection being located substantially at the two upper corners of the triangle, said gripping unit being movable around said curved edge portion of said die during the stretch bending operation from an initial position in which said gripping unit extends substantially parallel to said guideway to a final position beneath the overhanging curved edge portion of the die and in which said gripping unit extends substantially at right angles to said guideway, said movement of said gripping unit around said curved edge portion being a resultant movement resulting from the power actuated movements of said die, said carriage and said rocker means and during which resultant movement said third pivot means and said pivotal connection travel along an arcuate path located above said first pivot means.

15. In a stretch bending machine, a movable die support, a convex forming die on said die support and having a curved edge portion projecting in overhanging relation beyond said die support, means defining a guideway extending laterally away from said die support, a carriage movable endwise along said guideway, power means adapted to actuate said carriage along said guideway, rocker means pivoted on said carriage by a first pivot means located adjacent the end of the carriage nearest said die, said rocker means comprising substantially triangular upright bracket members spaced apart transversely of said carriage, power cylinder means pivoted on said carriage by a second pivot means located adjacent the remote end of said carriage, said power cylinder means having pivotal operating connection with said rocker means and being operable to swing said rocker means toward said curved edge portion of said die, a gripping unit comprising a body swingably mounted between said bracket members by a third pivot means and a grip head elongated in a direction transversely of said carriage, said grip head being supported by said body for both tiltable and translatory movement relative thereto and having gripping devices distributed therealong for gripping engagement with an end of a workpiece extending across said die, power means effective on said die support and operable to apply a bending force to said workpiece through said die, a group of cylinders in said body and disposed in parallel relation in a row extending transversely of said carriage, pistons operable in said cylinders and connected with the grip head at points spaced along the latter for producing the tiltable and translatory movement of said grip head relative to said body, and a third pivot means mounting said gripping unit on said rocker means for swinging between said bracket members and for translatory movement by said rocker means, said rocker means having substantially an inverted-triangle shape with said first pivot means located substantially at the lower apex of the triangle and said third pivot means and said pivotal connection being located substantially at the two upper corners of the triangle, said gripping unit being movable around said curved edge portion of said die during the stretch bending operation from an initial position in which said gripping unit extends substantially parallel to said guideway to a final position beneath the overhanging curved edge portion of the die and in which said gripping unit extends substantially at right angles to said guideway, said movement of said gripping unit around said curved edge portion being a resultant movement resulting from the power actuated movements of said die, said carriage and said rocker means and during which resultant movement said third pivot means and said pivotal connection travel along an arcuate path located above said first pivot means.

References Cited in the file of this patent

UNITED STATES PATENTS

| | | |
|---|---|---|
| 2,129,774 | Kuhner | Sept. 13, 1938 |
| 2,269,549 | Oeckl | Jan. 13, 1942 |
| 2,332,926 | May | Oct. 26, 1943 |
| 2,346,213 | Flowers | Apr. 11, 1944 |
| 2,431,173 | Hawkes | Nov. 17, 1947 |
| 2,437,092 | Greene | Mar. 2, 1948 |
| 2,437,105 | Lindsey | Mar. 2, 1948 |
| 2,442,268 | Fields | May 25, 1948 |
| 2,446,089 | Hochreiter | July 27, 1948 |
| 2,459,132 | Nielsen | Jan. 11, 1949 |
| 2,553,092 | Hubbert | May 15, 1951 |
| 2,632,493 | Gray | Mar. 24, 1953 |

FOREIGN PATENTS

| | | |
|---|---|---|
| 621,397 | Germany | Nov. 6, 1935 |